(12) United States Patent
Droste et al.

(10) Patent No.: US 11,655,846 B2
(45) Date of Patent: *May 23, 2023

(54) SNAP NUT CONCRETE ANCHOR ASSEMBLY

(71) Applicant: Black & Decker Inc., New Britain, CT (US)

(72) Inventors: Manfred Droste, Limburg-Offheim (DE); Benjamin Schramm, Eppenrod (DE)

(73) Assignee: BLACK & DECKER INC., New Britain, CT (US)

( * ) Notice: Subject to any disclaimer, the term of this patent is extended or adjusted under 35 U.S.C. 154(b) by 184 days.

This patent is subject to a terminal disclaimer.

(21) Appl. No.: 17/147,024

(22) Filed: Jan. 12, 2021

(65) Prior Publication Data

US 2021/0131480 A1  May 6, 2021

Related U.S. Application Data

(62) Division of application No. 15/948,131, filed on Apr. 9, 2018, now Pat. No. 10,920,819.

(30) Foreign Application Priority Data

Apr. 13, 2017 (EP) .................................. 17166593
May 12, 2017 (EP) .................................. 17170866

(51) Int. Cl.
*F16B 31/02* (2006.01)
*F16B 39/36* (2006.01)
*F16B 37/08* (2006.01)

(52) U.S. Cl.
CPC .............. *F16B 39/36* (2013.01); *F16B 31/02* (2013.01); *F16B 37/0857* (2013.01)

(58) Field of Classification Search
CPC ....... F16B 37/0842; F16B 37/08; F16B 39/36
USPC ......................................... 411/433, 432, 434
See application file for complete search history.

(56) References Cited

U.S. PATENT DOCUMENTS 1,475,907 A * 11/1923 Volman ............... F16B 37/0864
 279/7
2,789,458 A * 4/1957 Skeisvoll ............ F16B 37/0821
 411/433
3,038,366 A * 6/1962 Hindman ............ F16B 37/0892
 411/433

(Continued)

*Primary Examiner* — Gary W Estremsky
(74) *Attorney, Agent, or Firm* — Kofi A. Schulterbrandt

(57) ABSTRACT

The present disclosure describes an anchor device for receiving and securing a shaft thereto. The device includes an outer housing within which a jaw assembly is secured. The outer housing of the device may in turn be secured to or within a support structure such as a building component. Jaw components of the jaw assembly may be threaded. Furthermore, the jaw assembly has at least two configurations. In a first configuration, at least one jaw component is positioned away from a central shaft axis against the biasing force of a biasing member. A removable or reconfigurable holding member or stop member selectively secures the at least one jaw component in its position. In as second configuration, the holding member is reconfigured by the inserted shaft to trigger movement of the at least one jaw component toward the central shaft axis and into contact with the shaft.

14 Claims, 18 Drawing Sheets

(56) References Cited

U.S. PATENT DOCUMENTS

| | | | | |
|---|---|---|---|---|
| 3,147,662 | A | * | 9/1964 | Snook ................ F16B 37/0857 411/433 |
| 3,334,536 | A | | 8/1967 | Armstrong |
| 4,258,944 | A | * | 3/1981 | Wendel ................ E03C 1/122 285/298 |
| 5,039,266 | A | * | 8/1991 | Nagayoshi .......... F16B 37/0892 411/433 |
| 5,094,578 | A | * | 3/1992 | Light ...................... F16B 2/10 248/74.5 |
| 5,139,381 | A | | 8/1992 | Lubreski et al. |
| 5,160,233 | A | | 11/1992 | McKinnis |
| 6,514,827 | B2 | * | 2/2003 | Kim ................ H01L 21/823842 438/303 |
| 8,047,923 | B2 | * | 11/2011 | Emerson ................ B23G 9/009 470/67 |
| 8,272,083 | B1 | * | 9/2012 | Liston .................. E03C 1/0401 411/432 |
| 8,708,629 | B2 | * | 4/2014 | Smith .................... F16B 39/32 411/433 |
| 9,945,115 | B2 | | 4/2018 | Lin |
| 2009/0053010 | A1 | * | 2/2009 | Schnier ............. F16B 37/0892 403/19 |
| 2010/0166525 | A1 | | 7/2010 | Dvorak |
| 2011/0182697 | A1 | * | 7/2011 | Smith ................ F16B 37/0857 411/433 |
| 2013/0067849 | A1 | | 3/2013 | Espinosa |
| 2013/0302112 | A1 | * | 11/2013 | Scherer .................. F16B 37/08 411/433 |
| 2019/0178280 | A1 | * | 6/2019 | Huang ................ F16B 37/045 |

\* cited by examiner

SNAP NUT CONCRETE ANCHOR ASSEMBLY

CROSS-REFERENCE TO RELATED APPLICATIONS

This application is a Divisional of U.S. patent application Ser. No. 15/948,131, filed Apr. 9, 2018, which claims priority from EP Patent Application No. EP17166593.8, filed Apr. 13, 2017, and EP Patent Application No. EP17170866.2, filed May 12, 2017 the disclosures of which is incorporated herein by reference in its entirety.

FIELD OF THE INVENTION

The present invention relates to anchors for use in concrete substrates.

BACKGROUND OF THE INVENTION

Concrete structures are typically formed from concrete substrates, being either the type made off site (commonly known as pre-cast concrete substrates) or the type made on site (commonly known as cast in place (CIP) concrete substrates). Both types of concrete substrates may be reinforced with metal of other suitable materials depending on their intended application. It is often necessary to attach fixtures and fittings to concrete substrates, the nature of which might vary according to the type of structure. For instance, many buildings have floors or walls made from concrete panels from which ducts or other items may be suspended, bridges may include concrete portions from which signage and other items must be hung, and so on. This often requires an anchor to be secured to or within the concrete substrate such that the fixtures and fittings can be mechanically fastened to the anchor. The anchors of interest here are those which are installed during production of the substrate, rather than those retrofitted to the concrete substrate after production. The general process for installing these anchors includes the steps of setting out a form board, mounting the anchor in the desired position on the form board, securing the anchor to the form board, pouring concrete over the form board and the anchor, removing the form board from the set concrete so as to reveal at least a portion of the anchor in the underside of the concrete substrate. The revealed portion of the anchor may expose a receptacle into which a threaded rod may be received and secured. In other words, these anchors comprise an anchor point accessible from the underside of the concrete substrate and which typically take the form of a threaded bore into which a bolt or threaded shaft can be fastened.

Because different structural designs require different diameter bolts or threaded shafts, numerous designs have been proposed such that a single threaded bore structure mentioned above is able to accommodate different sized/diameter bolts or threaded rods. Typically, such threaded bore structures embody some sort of separable split nut concept in which a threaded bore includes at least two separable threaded parts or portions. The parts are able to be forced apart radially from a central longitudinal axis of the rod or bolt and then are biased back together so that interior female threads of the bore portions complementarily engage the external male threads of the rod or bolt. Many of these designs allow a rod or bolt to be installed by simply forcing the rod or bolt axially into the bore portions spreading the bore portions apart and then allowing the bore portions to be axially biased radially inward (e.g., by a flexible biasing member) onto the rod or bolt.

At least U.S. Pat. Nos. 4,368,606 and 5,468,105 teach the biased split nut concept embodied in an anchor that is attachable to formwork (e.g., wooden formwork). U.S. Pat. No. 4,007,563 discloses an anchor for setting in metal decking. The present application also contemplates replacement of the female thread receptacle disclosed therein with the snap locking system described below. All three patents are incorporated by reference herein in their entirety.

While split nut designs provide a certain flexibility with axial installation and accommodation of multiple thread sizes, this structure can also present some reliability challenges. Specifically, mating between the threads of the rod and nut portions is important, so it is best when the alignment of the separate bore portions is maintained and it would be preferred if the user could have assurances that proper alignment of the portions and complete collapse of portions onto the rod or bolt has occurred.

It is therefore an object of the present invention to provide an anchor which is easy to install and whose integrity is not affected by careless installation.

BRIEF SUMMARY OF THE INVENTION

According to a first aspect of the invention, there is provided a base member connectable to a support member to form an anchor assembly mountable to a form board or metal decking on which wet concrete may be poured during formation of a concrete substrate, the base member includes a mounting portion for mounting the anchor assembly to the form board. The base member may also include a main guide having first and second generally opposed ends, the first end being open to facilitate insertion of the support member into the main guide. The main guide may also including a generally tubular body upstanding from the mounting portion. The tubular body may have an internal cross-section sized and shaped to correspond closely with the cross-section of the support member so as to create a snug fit between the main guide and the support member.

Advantageously the base member includes at least one reinforcement member to improve the rigidity and or strength of the main guide. The reinforcement member may comprise at least one web arranged between the main guide and the mounting portion and preferably spaced equidistantly around the main guide.

One type of reinforcement member may include at least one rib arranged axially and projecting inwardly. The at least one rib may add increased stiffness and lateral support between the main guide and the support member to resist inadvertent deformation and/or disassembly of those parts. The plurality of ribs circumferentially spaced around the main guide and each disposed between two neighbouring channels.

According to a second aspect of the invention, there is provided a cast in place anchor assembly comprising a base member as described above and a support member located in the main guide of the base member. The support member may include attachment means accessible through the second end of the main guide. For instance, the support member may comprise a shank having opposed first and second ends.

Specifically, the support member includes an outer housing, the outer housing being defined by a longitudinal axis, the outer housing including a wall, the outer housing also including a connector opening at a first end thereof for receiving the threaded shaft/shank, the outer housing further including an assembly opening at a second end opposite the first end thereof, the housing wall including an inner surface defining a bore space.

The support member further includes a bore assembly disposed in the bore space, the bore assembly including at least one female threaded bore portion the threads of which selectively engage threads of the shaft, the bore assembly further including a bias member for biasing the at least one female thread bore portion toward the longitudinal axis. A holding member is provided that prevents the bias member from moving the at least one female threaded bore portion toward the longitudinal axis.

The bore assembly may take two different configurations. In a first bore assembly configuration, the holding member prevents the at least one female threaded bore portion from moving toward the central longitudinal axis. Furthermore, in the first configuration the threaded shaft is inserted into the connector opening, to contact the holding member to release the at least one female threaded bore portion to move toward the central longitudinal axis and into biased contact with the threaded shaft to define a second bore assembly configuration.

BRIEF DESCRIPTION OF THE DRAWINGS

By way of example only, embodiments of the present invention will now be described in detail, with reference being made to the accompanying drawings, in which.

DETAILED DESCRIPTION OF THE PREFERRED EMBODIMENT

Figure 1A:
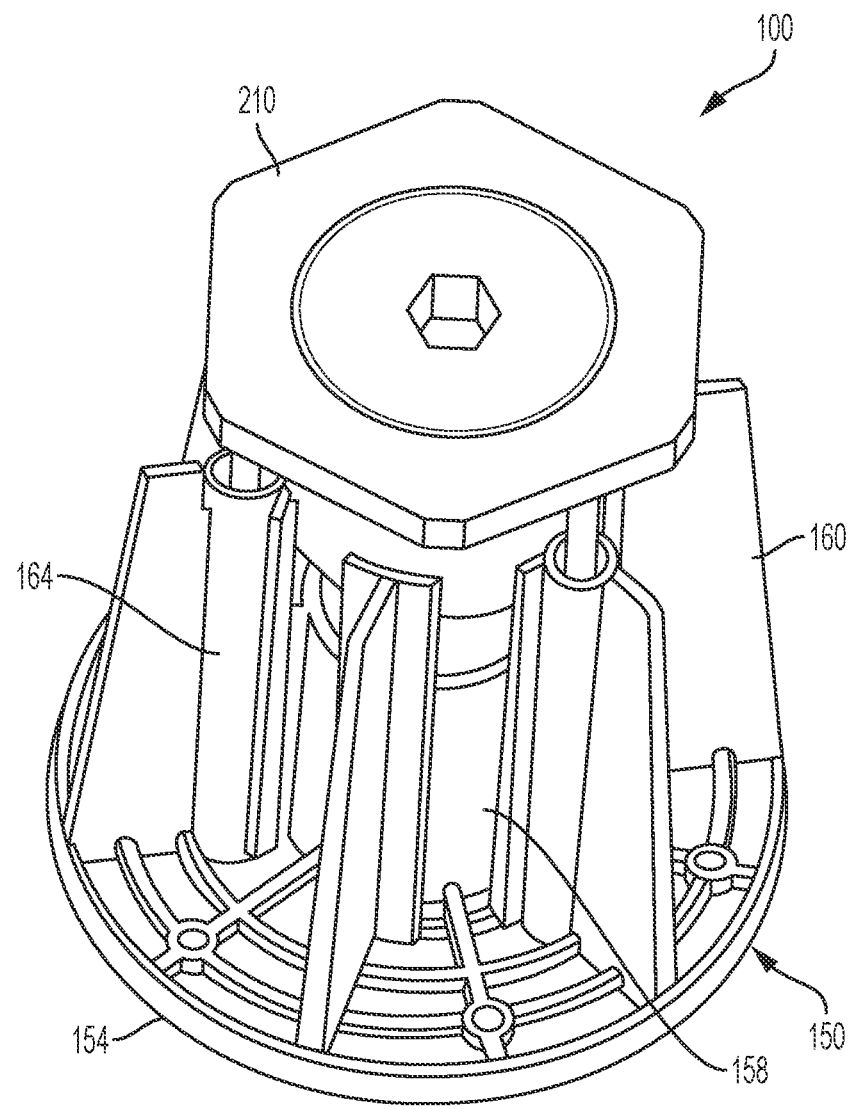
FIG. 1A is a first perspective view of an anchor assembly of the present invention.
Figure 1B:
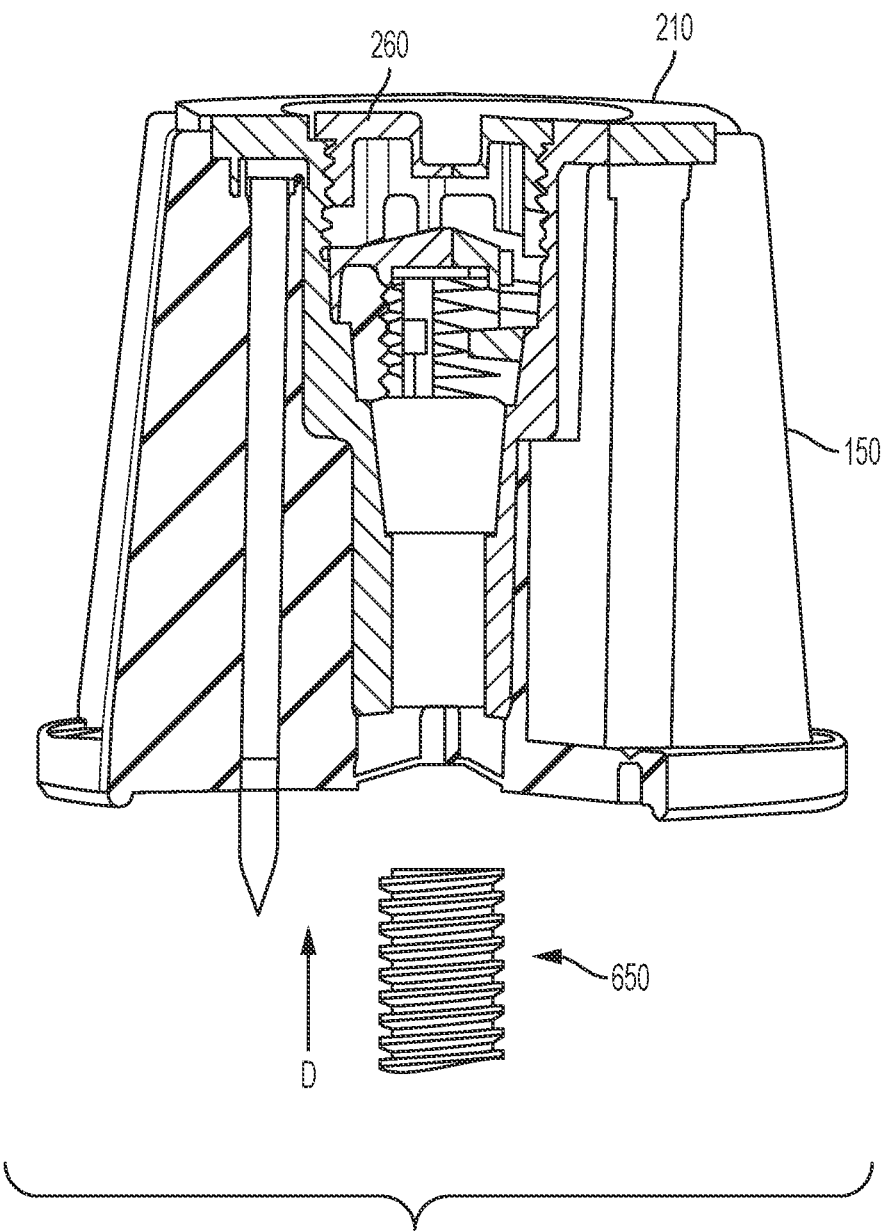
FIG. 1B is a side cutaway view of the anchor assembly of FIG. 1 receiving a threaded shaft.

FIGS. 1A and 1B show an embodiment of an anchor assembly of the present invention, which is generally indicated as 100 and may receive a threaded shaft 50, 650 inserted in a direction D. Anchor assembly 100 includes a support member 210 to be supported within a base member 150. Base member 150 may be mounted to a form board (not shown) for defining a poured concrete structure. Base member 150 may include a form engagement support 154 and a raised main guide 158 for receiving and positioning support member 210 relative to the form after assembly. Raised main guide 158 may be further reinforced by ribs or structural aids 160 that hold raised main guide 158 securely relative to base member 150. Structural aids may come in various forms and may include channels 164 through which fasteners (e.g., nails) pass and then enter the form for securing anchor assembly 100 to the form. Also shown in FIGS. 1A and 1B is a plug 260 to be discussed in more detail below.

Figure 2:
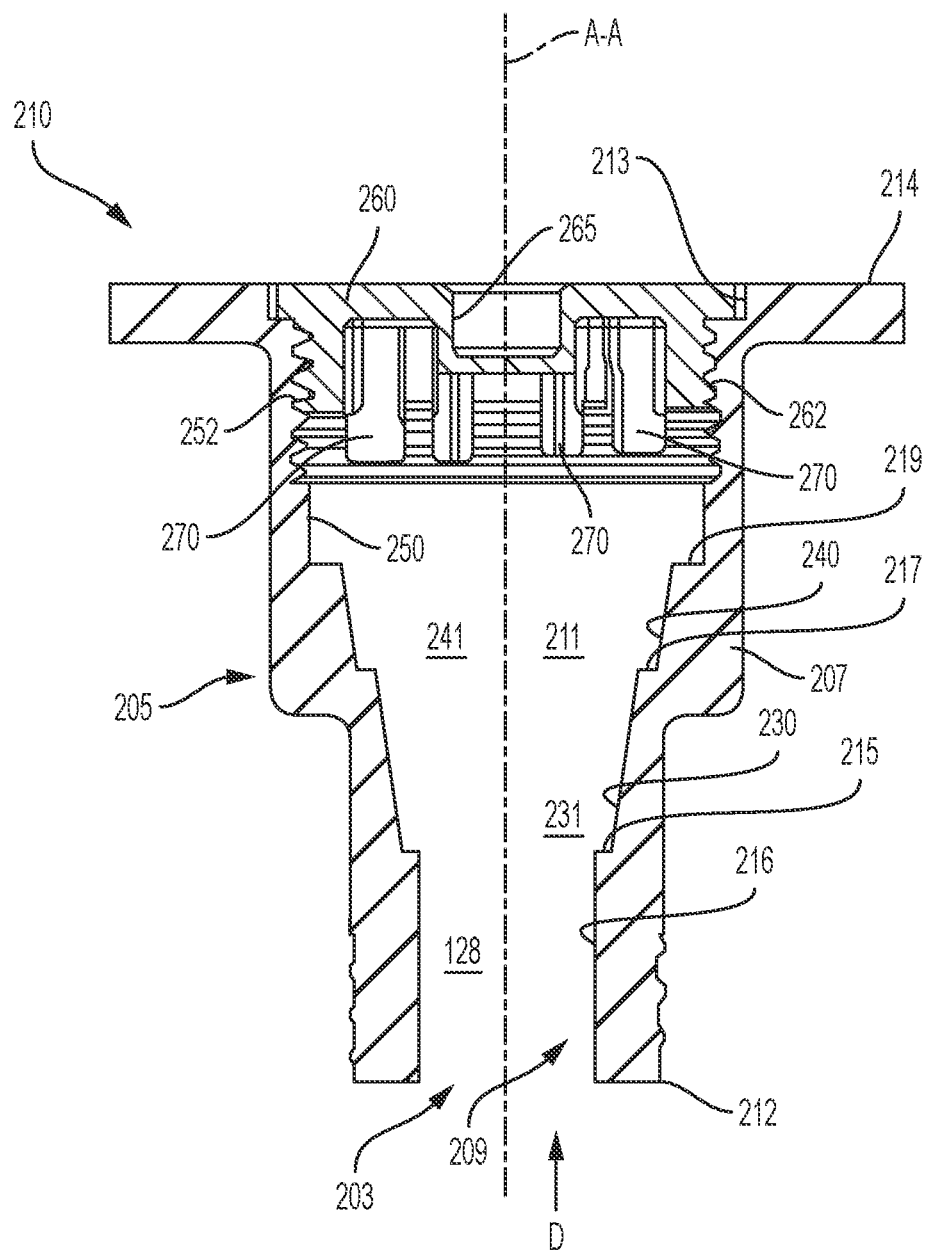
FIG. 2 is cross-sectional view of a support member of the anchor assembly of FIGS. 1 and 2.

FIG. 2 shows a cross-section of support member 210 of anchor assembly 100. Support member 210 includes an outer housing 205. Outer housing 205 includes a wall 207 having an inner surface 209 and a central longitudinal axis A-A. Inner surface 209 defines a bore space 211. A connector opening 203 is disposed at a first end 212 of outer housing 205. An assembly opening 213 is disposed at a second end 214 of outer housing 205. Inner surface 209 includes a lower wall surface 216 that defines a connector passage 128 through which a connector such as threaded rod 50 may be inserted into bore space 211 in an insertion direction D.

Inner surface 209 also includes a first tapered or first conical surface 230 that tapers to a narrower end toward first end 212. First conical surface 230 defines a first conical space 231 and may be adjacent to lower wall surface 216. Inner surface 209 may further include a second tapered or second conical surface 240. Second tapered surface 240 defines a second conical space 241 and may be located on an opposite side of conical surface 230 from lower wall surface 216. Therefore, bore space 211 includes connector passage 128, first conical space 231, and second conical space 241. Like tapered surface 230, conical surface 240 tapers to a narrower end toward first end 212.

Inner surface 209 may further include an upper wall surface 250. Upper wall surface 250 may be directly adjacent to second conical surface 240 or be separated by a third ledge 219. Second conical surface 240 may be directly adjacent to first conical surface 230 or be separated by a second ledge 217. First conical surface may be directly adjacent to lower wall surface 216 or be separated by a ledge 215.

As mentioned above, at second end 214 of outer housing 205 is assembly opening 213. Assembly opening 213 may receive a number of items (discussed in more detail below) internally to bore space 211 before being closed by a plug 260. Plug 260 includes a periphery and the periphery includes a locking member or mechanism 262 such as a thread or threaded locking member. In addition, upper wall surface 250 includes a plug surface having a locking portion 252 such as a threaded portion. Locking mechanism 262 may be interlocked with locking portion 252 to secure plug 260 to upper wall surface 250. Plug 260 may further include a shaped opening 265 for accommodating a tool that applies a rotational force to plug 260 as plug 260 is installed (e.g., threadably) to upper wall surface 250. Plug 260 may further include projections 270 that extend into bore space 211 in a direction downward from second end 214 to first end 212.

FIGS. 3 and 4A-4C disclose a locking device or locking mechanism that is disposed in bore space 211 before being closed in by plug 260. Before installing plug 260 to support member 210, a locking assembly 300 may be inserted into bore space 211 through assembly opening 213. Locking assembly 300 includes a bore assembly 305 and a holding member 360. Bore assembly 305 may include a biasing member 310 and at least one female threaded bore portion 330A, 330B.

Biasing member 310 may be made from any elastic material (e.g., rubber, metal) capable of surrounding at least a portion of the at least one female threaded bore portion 330. In any case, bias member 310 need only be an elastic structure that urges (i.e., pulls or pushes) the threaded female portion toward a central longitudinal axis A-A of threaded rod 50 or of outer housing 205. In other words, elastic member 310 may also be disposed between inner surface 209 and an outer surface of bore portions 330.

Specifically, female threaded bore portions 330 include a concave threaded surface 334 and a tapered outer surface 338. Tapered outer surfaces of one or more bore portions 330 may combine to at least partially define a conical or frusto-conical outer surface. Bore portion may include a top surface 328 and a bottom 345. Bore portions 330 may further include a receptacle such as a groove 342 into which bias member 310 is securely received. Groove 342 may be in an outer surface of bore portion 330, but (as mentioned above) alternatively need only surround a portion of bore portion 330 to contact and so urge bore portion 330 toward central axis A-A. Two or three or more female threaded bore portions 330 may be used. Furthermore, threads 334 need not be standard threads and a single thread or projection and corresponding groove may suffice to satisfy the definition of threaded with respect to threaded surface 334.

Furthermore, bore portions 330 may include alignment tracks for maintaining alignment of bore portions 330 as bore portions 330 move toward and/or away from central longitudinal axis A-A in a plane perpendicular to axis A-A. For example, when bore assembly 305 includes two bore portions 330, alignment tracks may include a projection 346 extending from a first bore portion 330A being received (e.g., slidingly) in a track or groove 348 of the second bore portion 330B and visa versa. In addition, multiple projections 346 may be employed on a bore portion to be received in multiple corresponding tracks 348 on an opposite or complementary bore portion. The same concept could be applied to three or more bore portions 330. Such an inter-engagement between translating bore portions 330 minimizes wobble and may promote alignment between rod threads and bore portion threads. For example, if a plane is drawn through bore portions 330 and perpendicular to central axis A-A, the above described alignment mechanism will minimized wobbling of bore portions 330 about lines drawn in that plane through axis A-A.

Assembly 100 of the present invention transforms between two configurations. In a first configuration, threaded female surfaces 334 of one or more bore portions 330 are separated to a radius or radial distance (measured from or relative to A-A) larger than the external radius of threaded rod 50. In the first pre-snap configuration, threaded shaft 50 may pass axially in and out of threaded surfaces 334 without rotation. In a second configuration, the one or more bore portions 330 are released to be biased against or onto threaded rod 50 to prevent rod 50 from axial movement relative to support portion 210 except by rotation.

Figure 4A:
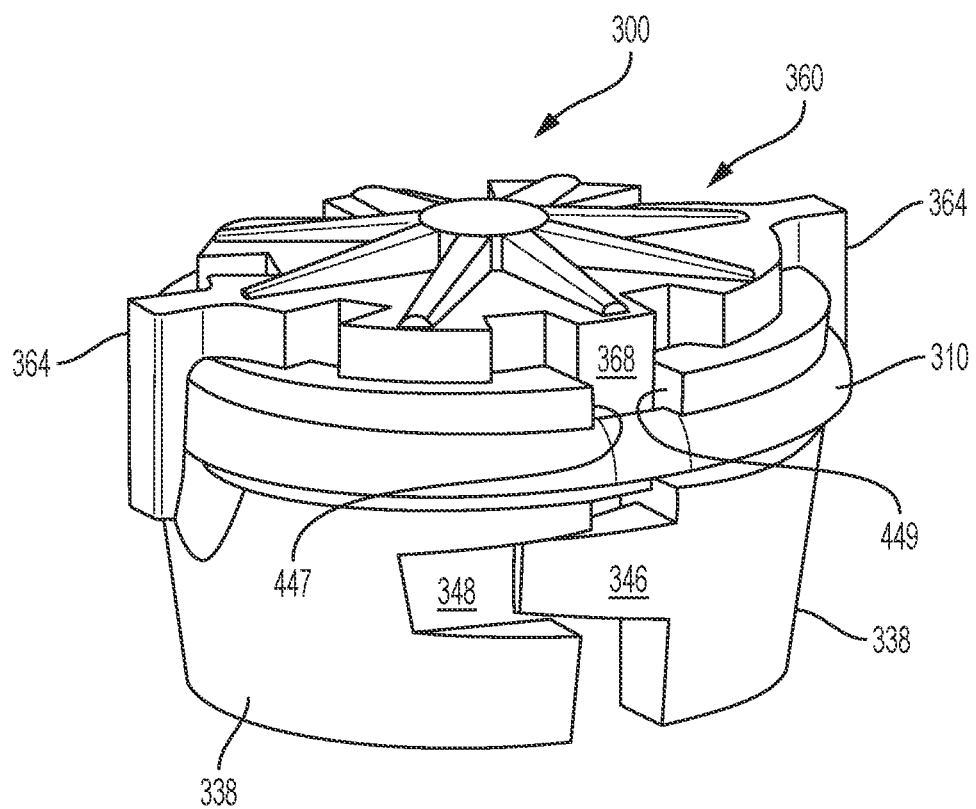
FIG. 4A is top perspective view of the locking assembly of FIG. 3 in a pre-snap assembled form.

As mentioned above locking assembly 300 includes a bore assembly 305 and a holding member 360 which are both received in bore space 211 through assembly opening 213. Holding member 360 includes inward external projections 364 and inward internal projections 368. FIG. 4A shows locking assembly 300 as it would be assembled in the first pre-snap configuration. In this arrangement, inward external projections 364 may be tapered and extend downward along an outer periphery of bore assembly 305. By this tapering and engagement of projections 364 against surface 209, inward external projections 364 tend to self-center holding member 360 relative to bore assembly 305 and central longitudinal axis A-A.

At the same time, internal projections 368 are positioned between end portions 447, 449 of bore portions 330 to hold bore portions 330 in a relatively separated configuration relative to the post-snap configuration. In this pre-snap configuration, threads 334 of bore portion 330 are disposed at a further distance from central axis A-A than the external threads of threaded shaft 50.

Figure 4B:
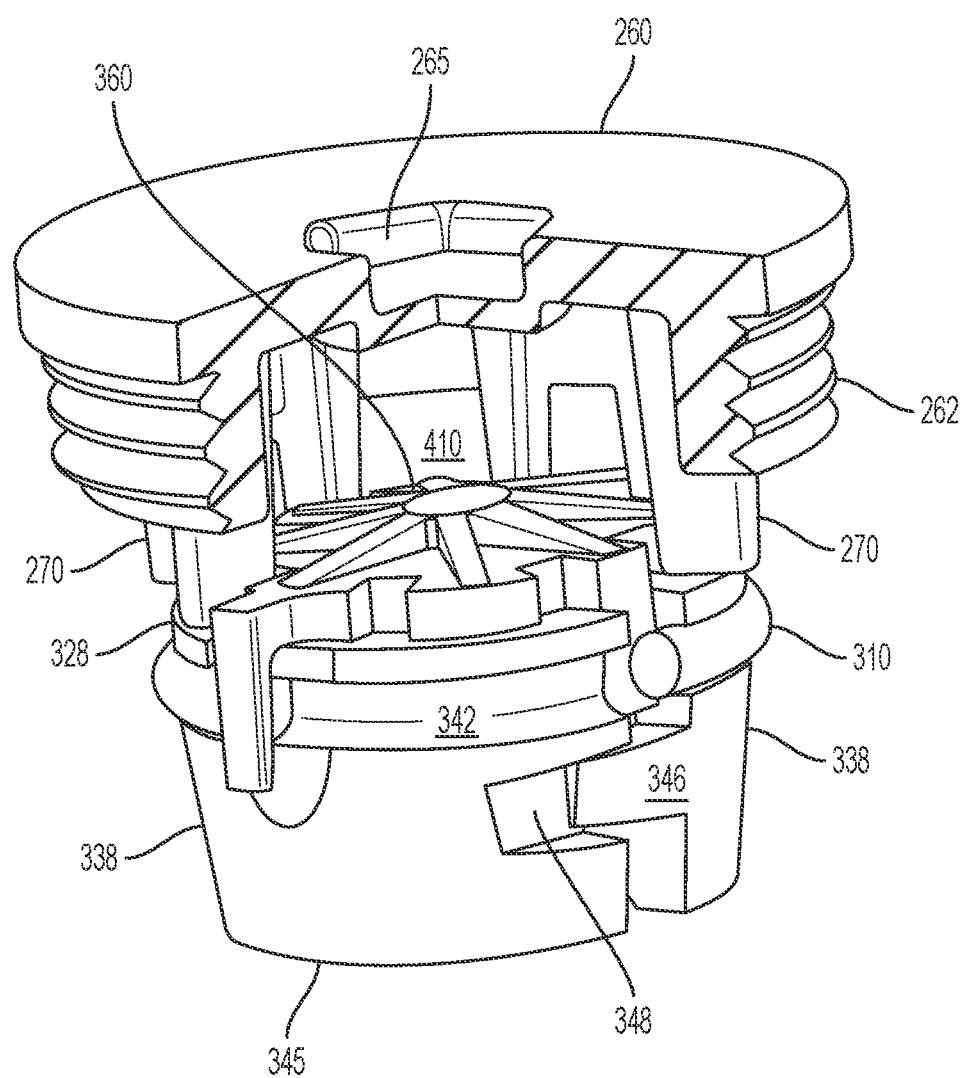
FIG. 4B is a top perspective view of the locking assembly of FIG. 3 assembled in the pre-snap configuration and positioned relative to a plug.
Figure 4C:
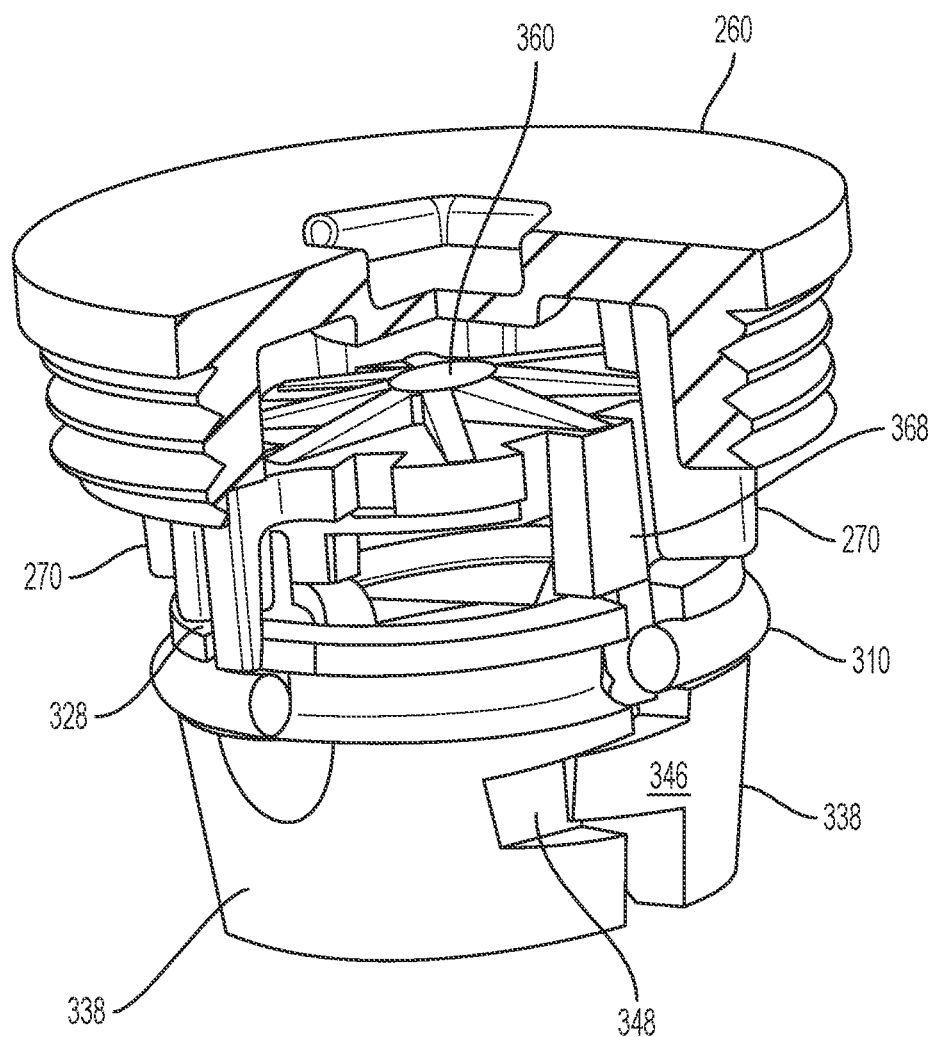
FIG. 4C is a top perspective view of the locking assembly of FIG. 3 with a holding member in a post-snap configuration and bore portions configured just before snapping.

FIGS. 4B and 4C show two configurations of holding member 360. In a first pre-snap configuration, shown in FIG. 4B, plug 260 sits installed in outer housing 205 (not shown). Downward projections 270 of plug 260 extend toward bore portions 330 and may contact an upper portion 328 of bore portions 330. Projections 270 may surround holding member 360 and define a surrounded holding space 410 (shown in FIG. 4A, but best seen in FIG. 7A). FIG. 4C shows how holding member 360 is able to be slid axially toward plug 260 and into the holding space 410 between projections 270. Bias member 310 maintains a radially inward tension on bore assembly 305 except that an upward force on holding member 360 relative to bore assembly 305 may move holding member 360 relative to bore assembly 305 until holding member 360 is no longer between bore portions 330. Bias member 310 is then no longer prevented from moving bore portions 330 toward central axis A-A, so they snap into the post-snap configuration. Projections 270 are sufficiently long to ensure that holding member 360 can move a sufficient distance in the axial direction toward plug 260 that internal projections 368 are no longer between and able to separate bore portions 330. While holding member 360 is being slid, projections 270 prevent bore portions 330 from also moving axially toward plug 260. Until completely removed, internal projection 348 prevent bore portions 330 from moving radially toward central axis A-A. FIG. 4C essentially shows the transition instant between the two configurations in which internal projections 348 is removed from between bore portions 330.

Figure 5A:
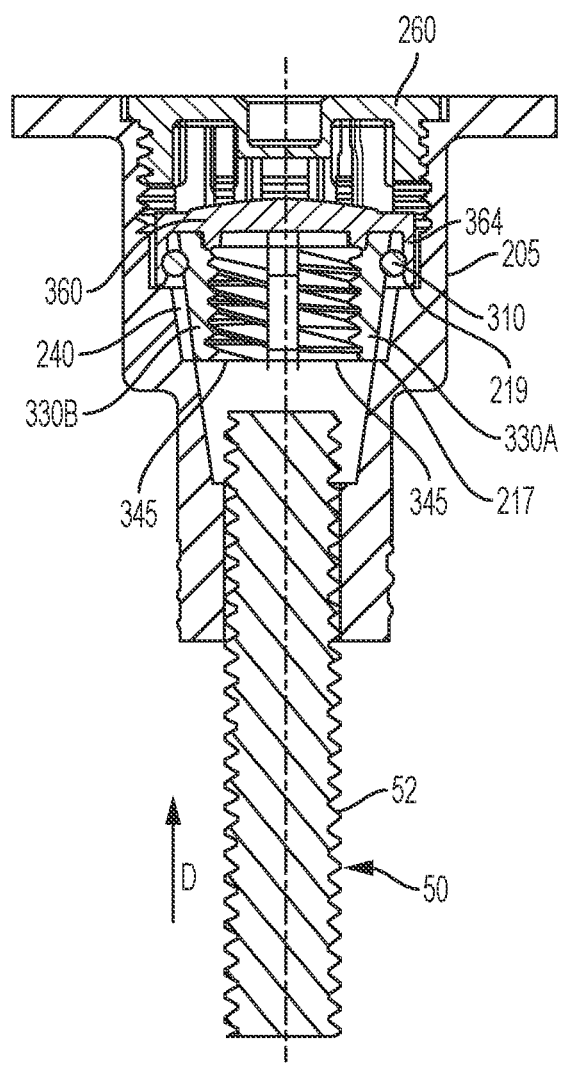
FIG. 5A is cross-sectional view of the anchor assembly of FIGS. 1 and 2 in the pre-snap configuration and receiving a threaded shaft.
Figure 5B:
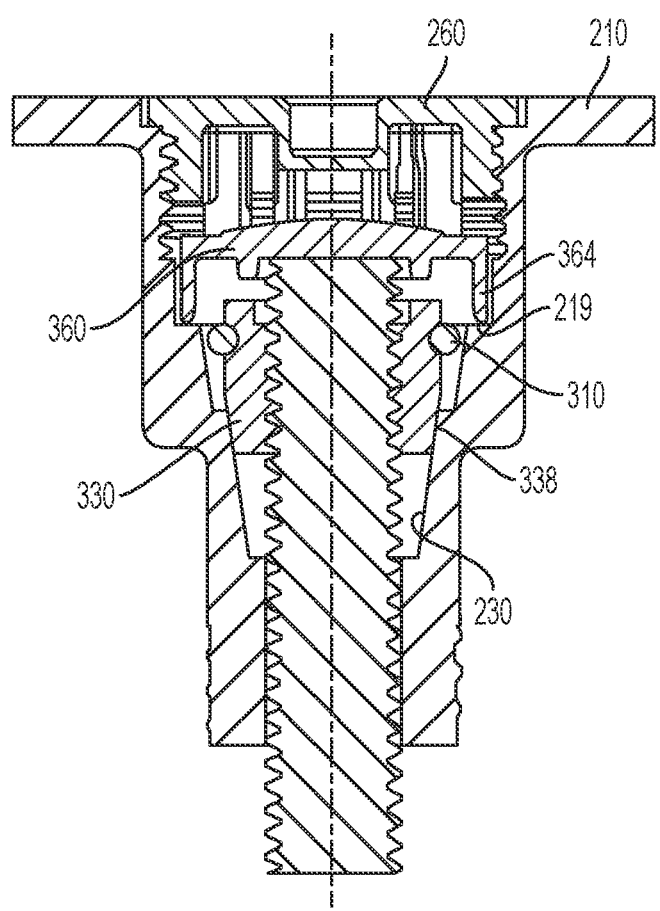
FIG. 5B is a cross-sectional view of the anchor assembly of FIGS. 1 and 2 having received a threaded shaft in the post-snap configuration.

FIGS. 5A and 5B show cross-sectional views of support member 210 with plug 260, bore assembly 305, and a holding member 360 installed in bore space 211. Specifically, FIG. 5A shows locking assembly 300 in the first pre-snap configuration. A threaded shaft 50 may be inserted into connector opening 203. Threaded rod 50 may then extend between threads 334 of bore portions 330 until a lead end of threaded rod 50 contacts an under portion of holding member 360. As bias member 310 urges bore portions 330 together and as internal projections 348 are squeezed between bore portions 330, friction is developed between bore portions 330 and holding member 360. Threaded rod 50 overcomes that reactionary frictional force as it moves/slides holding member 360 axially from the pre-snap to the post-snap configurations. FIG. 5B shows locking assembly 300 in the second post-snap rod locked configuration. In this configuration, threads 334 engage shaft threads 52 of threaded fastener 50 to lock threaded shaft 50 in an axial position relative to outer housing 205.

In addition to the biasing force of biasing member 310, outer housing 205 provides biasing force to urge bore portions 330 against threaded shaft 50. In the first pre-snap configuration, holding member 360 may sit on a first ledge 219 of inner surface 209. Bore portions 330 may sit on a second ledge 217 and within second tapered surface 240. The outer radius of projections 364 of holding member 360 may be larger than the inner radius of the third ledge 219 so that ledge 219 forms a stop to prevent holding member 360 from moving past third ledge 219 axially toward first end 212. Similarly, the bottom outer radius of bore portions 330 in the first pre-snap configuration is larger than the inner radius of second ledge 217 so that in the first pre-snap configuration, second ledge 217 acts as a stop to prevent bore portions 330 from moving axially past second ledge 217 in the direction of first end 212.

After holding member 360 is axially dislodged from between bore portions 330 by threaded rod 50, bore portions 330 collapse inward onto threaded member 50 due to the inward biasing force of biasing member 310. In the collapsed configuration, the outer diameter of bottom 345 of bore portions 330 is smaller than the inner diameter of second ledge 217. Therefore, in the second post-snap configuration, outer surface 338 of bore portions 330 may move axially past second ledge 217 into first space 231 and wedge onto first tapered surface 230. As discussed above, outer surfaces 338 of bore portions 530 may be tapered or conical to complement the first and second tapered conical surfaces 230, 240 of inner surface 209 of outer housing 205. Therefore, surface 230 and surface 240 may be generally parallel to each other or have generally the same angle relative to axis A-A. However, outer walls 338 of bore portions 330 may be generally complementarily angled or parallel to one or both of these surfaces 230, 240 to generate a wedging effect between surfaces 230, 240 and 338.

In the second post-snap configuration, shown in cross section in FIG. 5B, bore portions 330 collapse onto threaded rod 50 and both may move axially toward first end 212 until tapered surface 338 of bore portion 330 engages complementary tapered surface of first conical surface 230. If an axial load is applied to threaded rod 50 in the direction of first end 212, threads 52 of threaded rod 50 urge threads 334 of bore portion 330 in the same direction. Therefore bore portions 330 are urged toward first end 212 and first conical surface 230 in turn forces bore portions 330 axially inward toward central axis A-A and toward shaft 50. Therefore, an axial load on rod 50 toward first end 212 results in a forcing together of bore portions 330 to further lock threaded fastener 50 axially relative to outer housing 205. As a result, when outer housing 205 is secured in cured concrete, threaded rod 50 is secure axially in outer housing 205 so that is can be axially removed from outer housing 205 only by rotation.

Figure 6A:
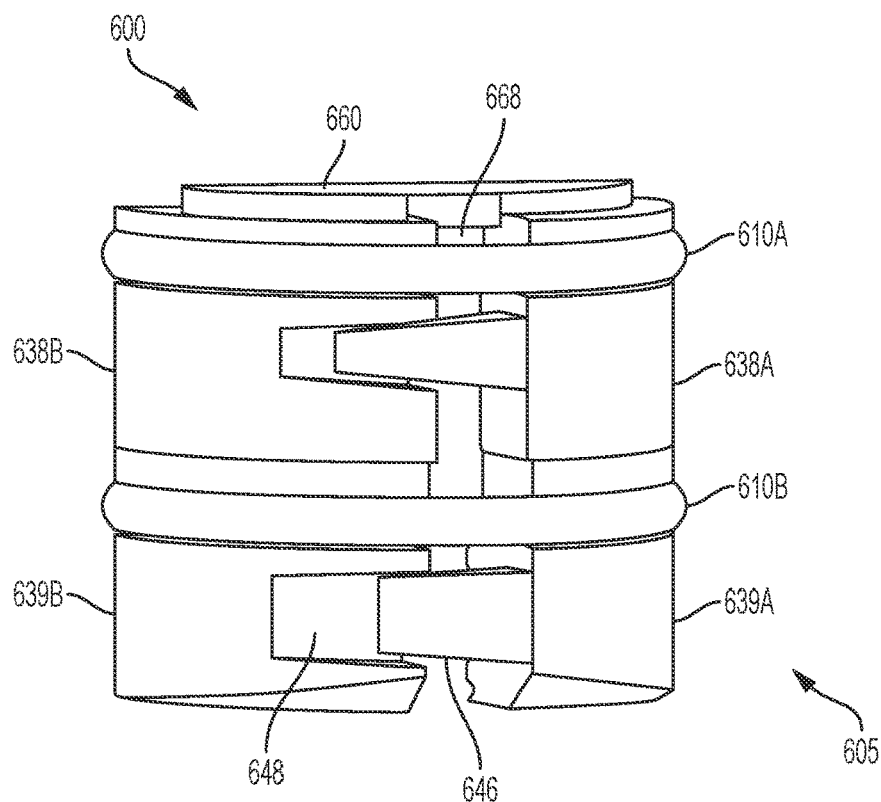
FIG. 6A shows a side view of a locking assembly of a second embodiment of an anchor assembly of the present invention in the pre-snap configuration.
Figure 6B:
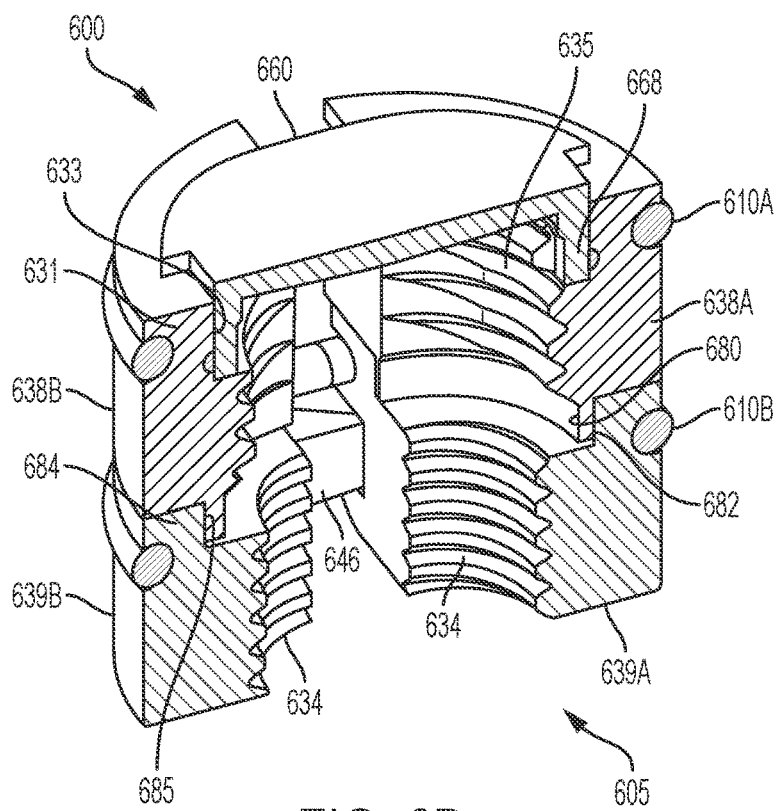
FIG. 6B is a top perspective cut-away view of the locking assembly of FIG. 6A.

FIGS. 6A and 6B show a locking assembly 600 similar to locking assembly 300 in FIGS. 4A-4C. Locking assembly 600 includes a holding member 660 and a bore assembly 605. Holding member 660 is similar to holding member 360 and includes an internal projection 668. Bore assembly 605 includes an upper bore assembly which includes bore portions 638A and 638B. Bore assembly 605 also includes a lower bore assembly which includes bore portions 639A and 639B. Upper and lower bore assemblies are similar to bore assembly 305 and each include a radial groove for respectively accommodating bias members 610A and 610B for the same purpose as disclosed above in bore assembly 305. Upper and lower bore assemblies also respectively include concave or female threads 635 and 634. Threads 634 and 635 complementarily accommodate male threads of different diameters. In other words, threads 634 and 635 may have diameters different from each other.

Upper and lower bore assemblies may also include one or more pairs of cooperating and corresponding alignment mechanisms similar to the mechanisms described for bore assembly 305 above. Specifically, each upper and lower assembly may include one or more pairs of projections 646 that correspond to grooves or tracks 648 in the other bore portion. Furthermore, the grooves and/or tracks may be tapered so that the cross-sectional area of projection 646 decreases as it cantilevers away from the bore portion and the cross sectional area of the groove increases toward where the projection enters the groove. The tapered arrangement ensures adequate compliance during snapping between configurations and alignment compliance is most accurate as the bore portions 638A, 638B and 639A, 639B are forced closer together.

Bore assemblies 638A, 638B and 639A and 639B may be stackable on each other. FIG. 6B shows an upper engagement portion 684 of lower bore assembly 639B and 639A includes a top and an inner radial bearing surface 685. A lower portion of upper bore assembly 638A, 638B includes at a bottom, a holding projection 680 on which is an outer radial surface 682. The bottom of upper bore assembly 638A, 638B sits on the top of lower bore assembly 639A and 639B. In addition, holding projection 680 extends axially downward past a top of lower bore assembly 639A and 639B and outer radial bearing surface 682 of upper bore assembly 638A and 638B may engage inner radial bearing surface 685 of lower bore assembly 639A and 639B when the bottom of upper bore assembly 638A, 638B sits on the top of lower bore assembly 639A and 639B in the first pre-snap configuration.

In a similar manner as holding member 360 above, holding member 660 is employed to separate bore portions 638A, 638B, 639A, and 639B in the first pre-snap configuration. Holding member 660 includes an axially downward projection 668 which may radially engage an inwardly facing surface 633 of top portion 631 of upper bore assembly 638A and 638B. Inwardly facing surface 633 may include a receptacle for complementarily receiving an outwardly extending locking projection of downward projection 668. The locking relationship between the projection and receptacle may more securely holding member 660 to upper bore portions 638 to ensure that no snapping occurs until intended engagement by threaded shaft 650A. Holding portion 660 holds upper bore portion sufficiently separated that an inner radius of concave female threads 635 of upper bore portion 638A, 638B is larger than an outer radius of threaded rod 650A to be inserted into locking assembly 600. When holding member 660 separates upper bore portions 638A and 638B and therefore threads 635, holding member 660 also separates lower bore portions 639A and 639B and therefore internal threads 634 in a radial position that is larger than external threads of threaded shaft 650A.

In the first pre-snap configuration, holding portion 660 separates lower bore assembly via upper bore assembly utilizing the structure described above. Specifically, when upper bore assembly 638A, 638B is held in the pre-snap configuration by holding member 660, outer radial surface 682 engages inner radial bearing surface 685 to limit the inward axial travel of lower bore assembly 639A, 639B. Therefore, the inner radial position of both sets of threads 634 and 635 is larger than the outer radial position of threaded rod 650A. This means that the radial position limiting imposed by holding member 660 on threads 634 and 635, ensures that threaded shaft 650A can be inserted into bore assembly 600 without engagement with or interference by threads 634, 635. Threaded Rod 650A will therefore experience uninhibited axial advancement until it contacts holding member 660.

Figure 7A:
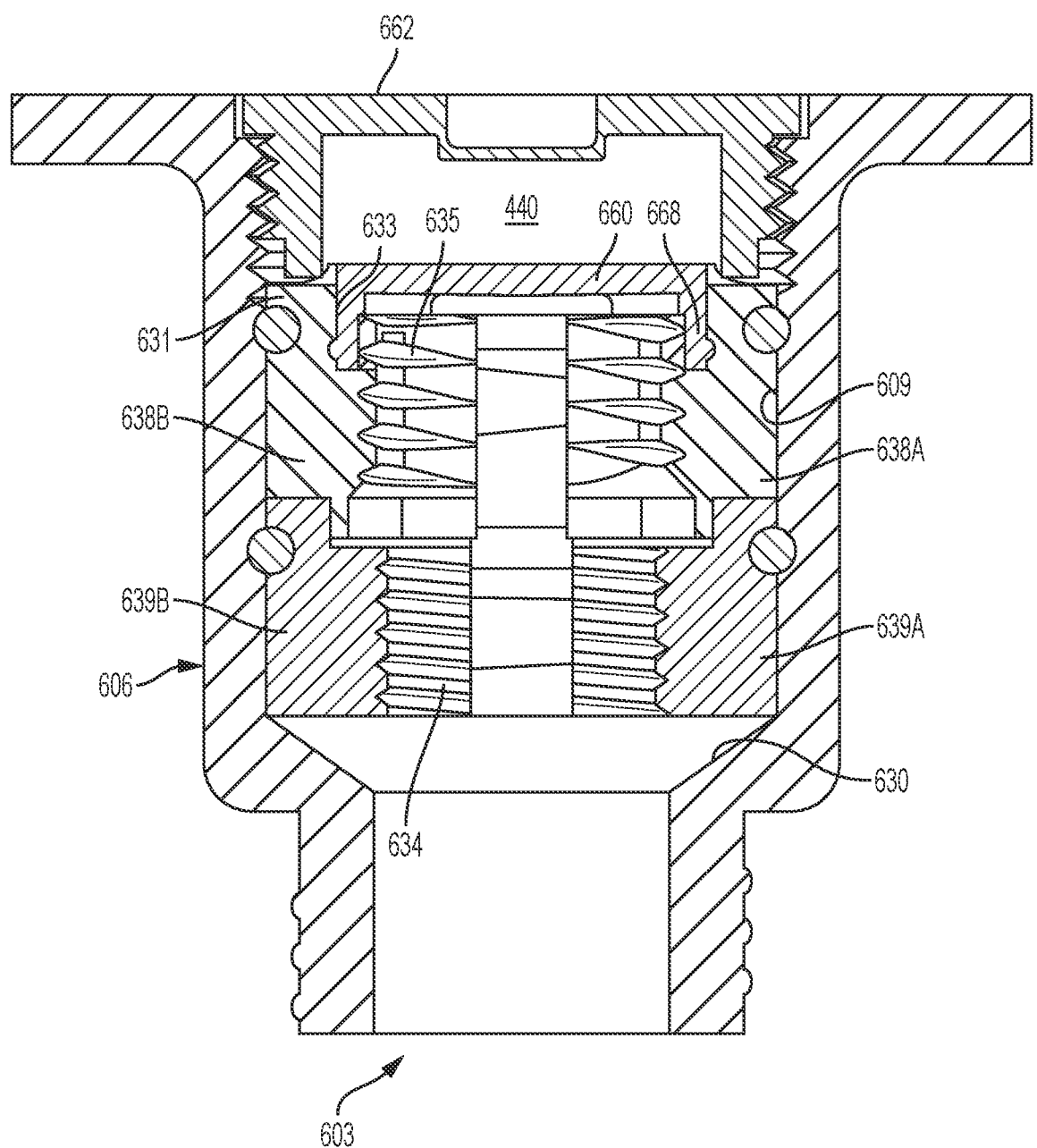
FIG. 7A is cross-sectional view of an anchor assembly including the locking assembly of FIGS. 6A and 6B secured therein and set in the pre-snap configuration.
Figure 7B:
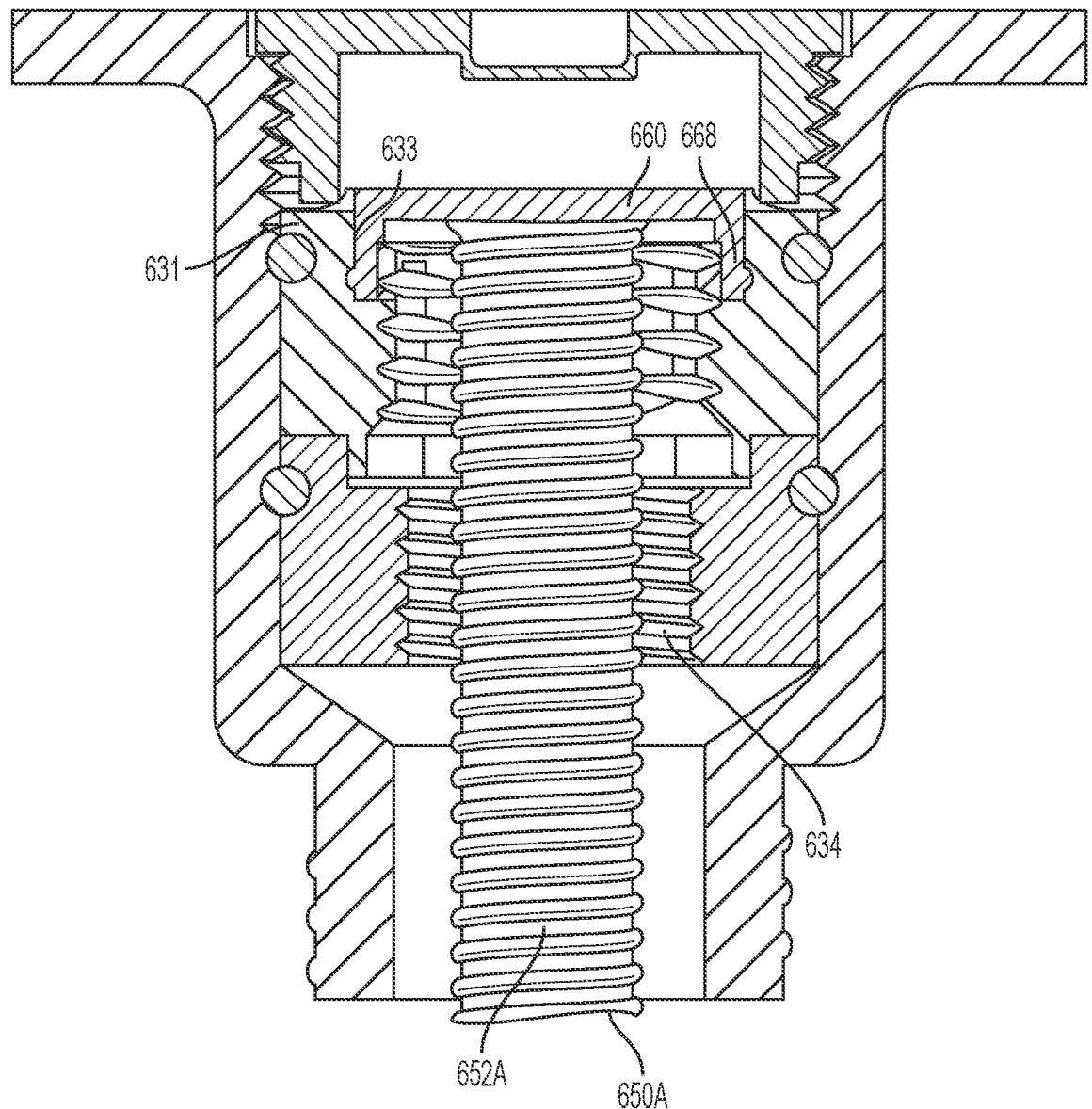
FIG. 7B is a cross-sectional view of the anchor assembly of FIG. 7A with the locking assembly in the pre-snap configuration and a threaded shaft inserted through the locking assembly.
Figure 7C:
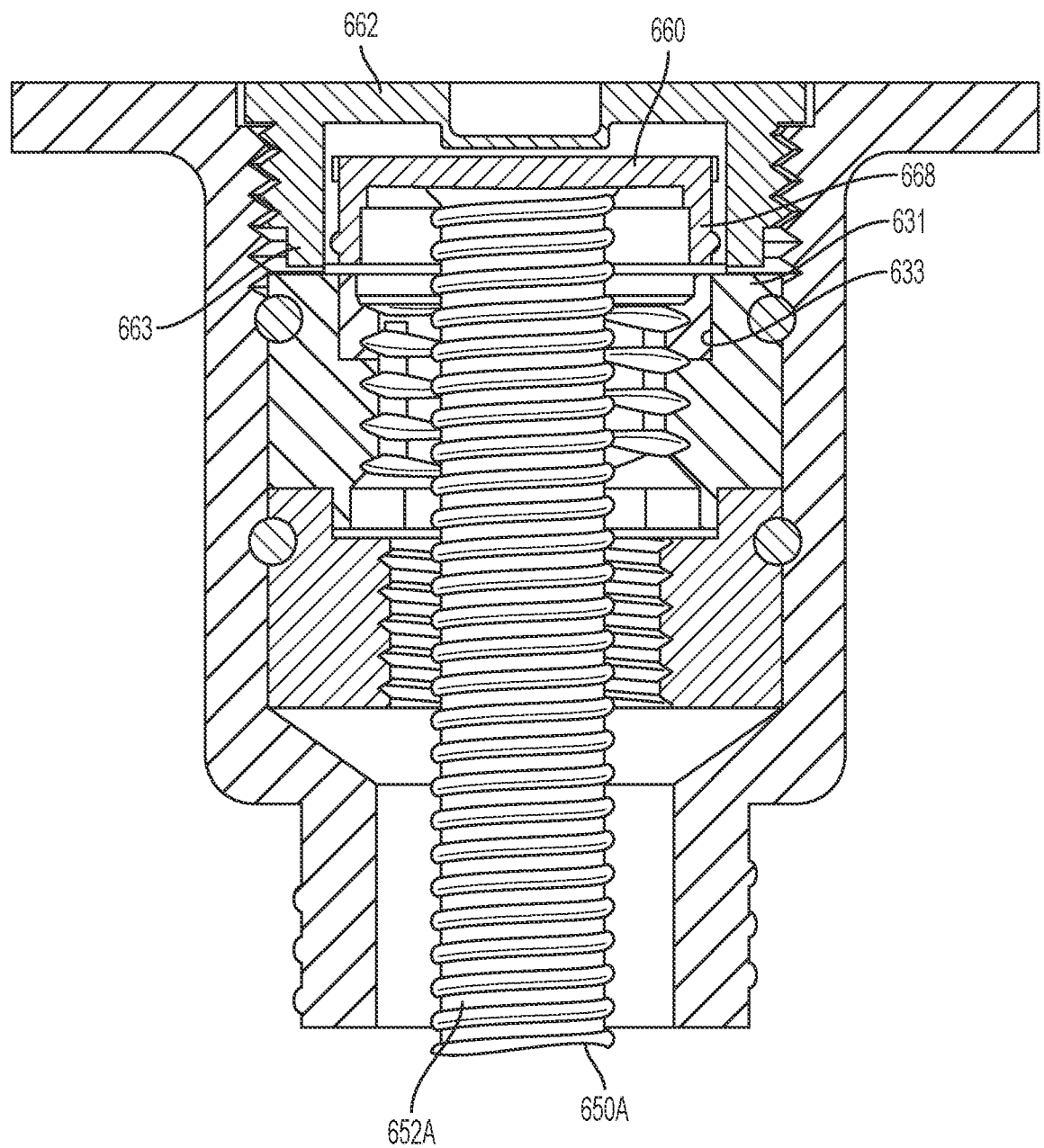
FIG. 7C is a cross-sectional view of the anchor assembly of FIG. 7B with a holding member in the post-snap configuration and the bore portions positioned just before snapping.

FIGS. 7A and 7B show a cross-sectional view of locking assembly 600 secured in an outer housing 606 trapped between tapered wall surface 630 and a bottom portion of plug 662. As with the single bore assembly 305 discussed above, in the pre-snap configuration of FIG. 7A, a clear passage is available through connector opening 603, through upper and lower bore assemblies, and up to holding portion 660. FIG. 7B shows threaded member 650A inserted axially in through and past a passage defined by threads 634, 635 and into engagement with a lower side of holding member 660. FIG. 7C shows threaded rod 650A advanced axially to push holding member 660 into a vacant space 440 in plug 662. Downward projection 663 of plug 662 prevents upper bore assembly 638A, 638B from moving upward axially with holding portion 660 as threaded rod 650A forces it up into the vacant space. Specifically, FIG. 7C shows both upper and lower bore assemblies the instant before they are biased toward central axis A-A by bias members 610A and 610B.

Figure 7D:
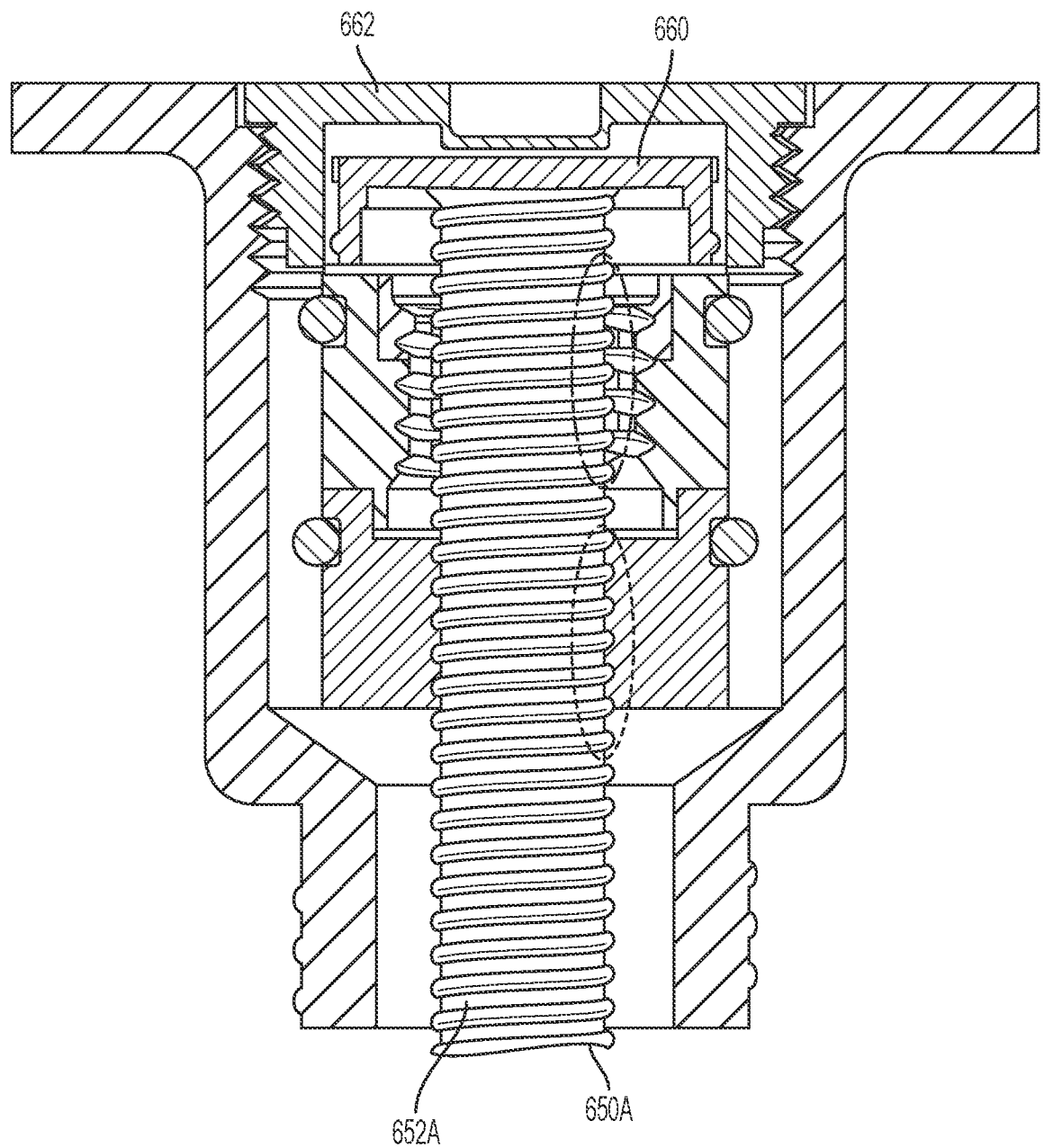
FIG. 7D is a cross-sectional view of the anchor assembly of FIG. 7C in the post-snap configuration with a lower jaw assembly engaging a first sized threaded rod.

FIG. 7D shows upper and lower bore assemblies collapsed or snapped toward and biased against threaded rod 650A. Specifically, based on a threaded rod 650A of a specific or certain size (e.g., ⅜"), threads 634 of lower bore assembly 639A, 639B engage snuggly and complementarily with threads 652A of threaded rod 650A. On the other hand, threads 635 of upper bore assembly 638A, 638B do not engage or do not engage threads 652A snuggly because a radius of rod 650A is such that when portions 638A and 638B come together and engage each other (as far toward axis A-A as possible), the resulting inner thread radius (of threads 635) is larger than the thread rod 650A outer thread radius. In other words, by contact with itself (i.e., upper bore portion assembly 638A, 638B) threads 635 of upper bore portion assembly 638A, 638B have a minimum radius that is larger than the max radius of rod threads 652.

Figure 7E:
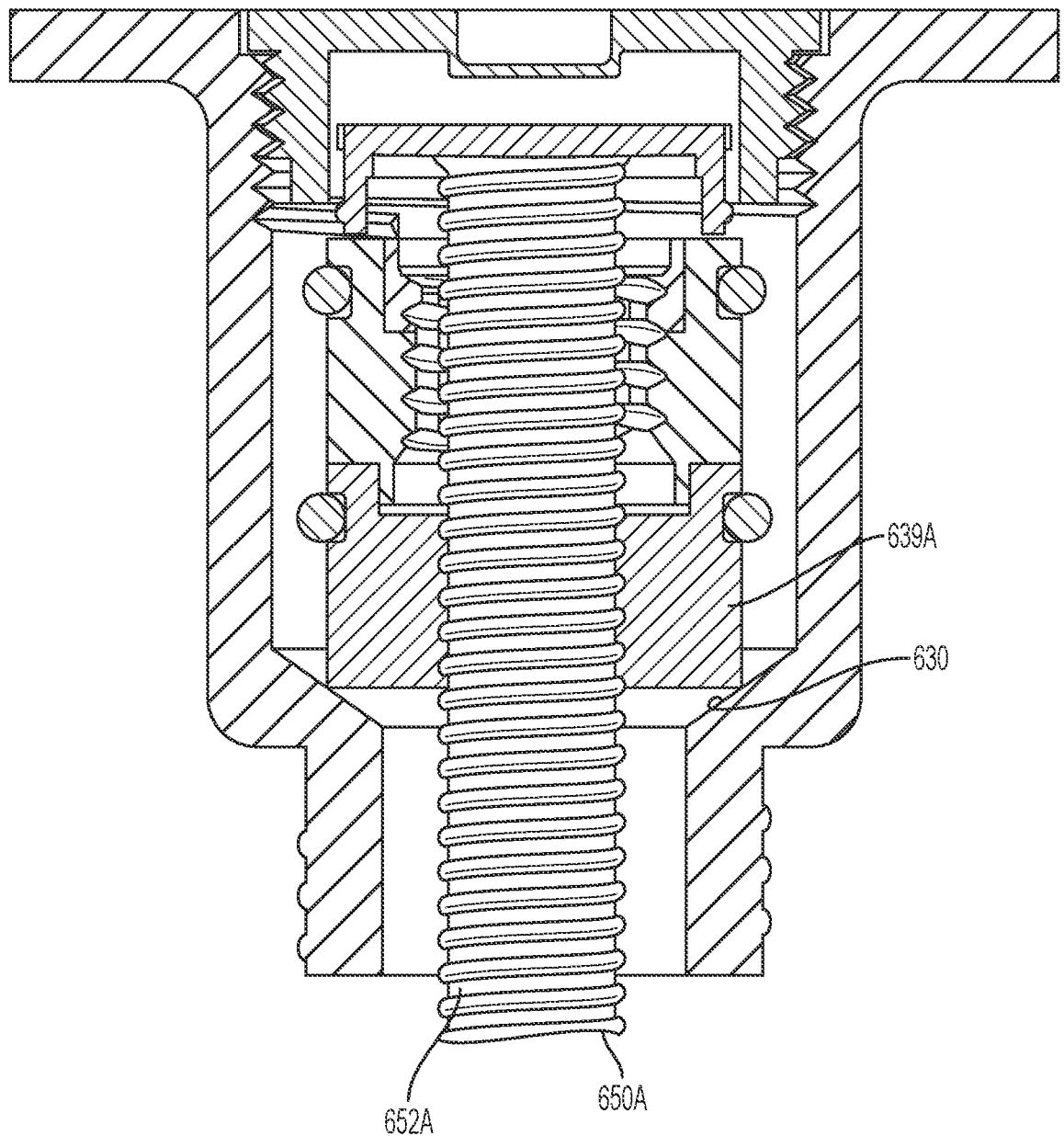
FIG. 7E is a cross-sectional view of the anchor assembly of FIG. 7D with the lower bore assembly in the post-snapped configuration and resting on the support member.

FIG. 7E shows threaded rod 650A engaged with lower bore assembly 639A, 639B and rod 650A lowered with bore assembly 605 attached thereto. Therefore, when threaded rod 650A is lowered, lower bore assembly 639A, 639B is also lowered until it contacts tapered wall surface 630. Threaded rod 650A is secured axially to lower bore assembly 639A, 639B and is not further able to be retracted from anchor 100 except for axial movement by rotation. With respect to load path, a downward load applied to threaded rod 650A is transferred to rod threads 652A, then to threads 634 of lower bore assembly 639A, 639B, then to lower bore assembly 639A, 639B, then to outer housing 606, and then to the surrounding cured concrete.

Figure 8:
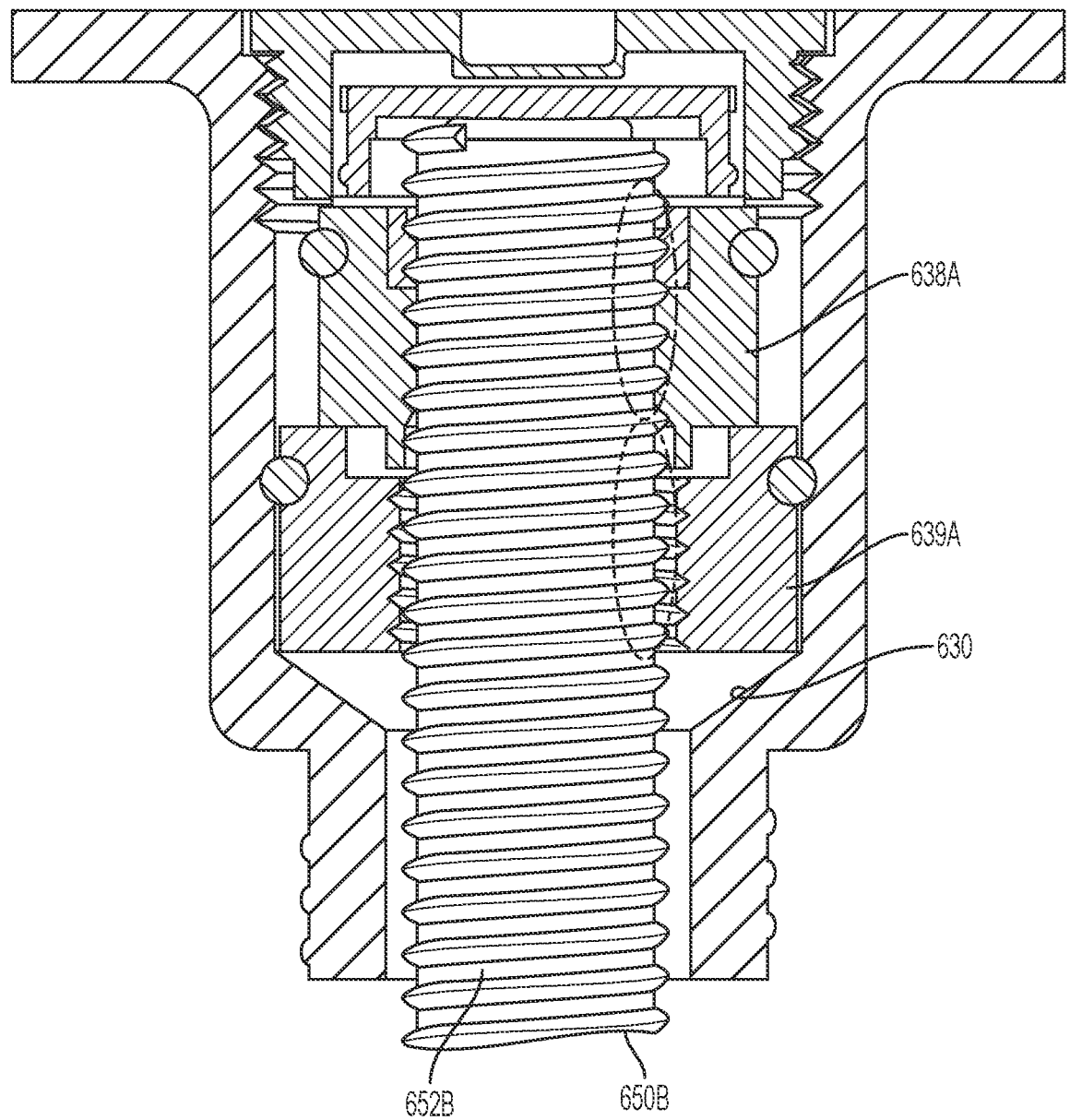
FIG. 8 is a cross-sectional view of the anchor assembly of FIG. 7A with the upper bore assembly in the post-snapped configuration and the lower assembly resting on the support member.
Figure 9:
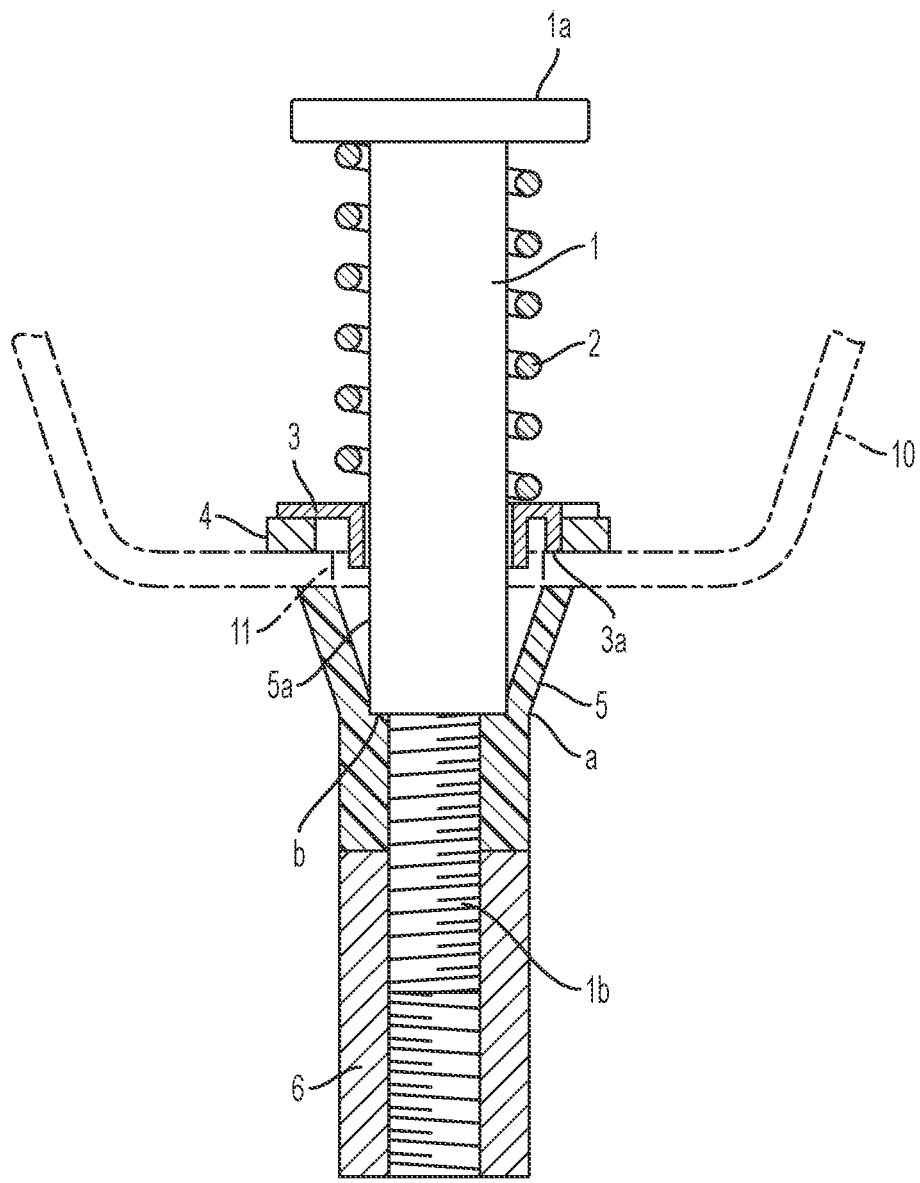
FIG. 9 is a cross sectional view of a prior art deck anchor.

FIG. 8 shows a threaded rod 650B that is of a different size/diameter (e.g., a larger ½" diameter) from threaded rod 650A. Threaded rod 650B is inserted into anchor 100 in the same manner as threaded rod 650A is shown inserted in FIG. 7C. However, because threaded rod 650B is of a larger diameter, upper and lower bore assemblies 638A, 638B, 639A, and 639B collapse or snap toward rod 650B differently. Specifically, threads 635 of upper bore assembly 638A, 638B collapses onto threads 652B to create a snug complementary threaded engagement. In other words, when the smaller diameter rod 650A was inserted, threads 635 were unable to reach threads 652A of rod 650A, but threads 635 are now able to reach the threads 652B of the larger diameter rod 650B. On the other hand, when the larger diameter rod 650B is inserted, the threads 634 of lower bore assembly 639A, 639B may engage rod threads 652B, but not snuggly and complementarily. This is because as discussed above, threads 634 and 635 may have different diameters for complementarily meshing or engaging with different sized male threaded fasteners. In other words, lower bore portions 639 may have thread sized to snuggly accommodate a shaft with a smaller radius than shaft 650B. Therefore, Axial locking of larger rod 650B is accomplished by the thread inter-engagement between rod 650B and upper bore assembly 638A, 638B. With regard to load path, after the bore assembly 605 snaps to secure itself to rod 650B, a downward load on rod 650B is transferred through rod threads 652B, then to bore portion threads 635, then to upper bore portion 638A, 638B then, to lower bore portion 639A, 639B, then to outer housing 606, and then to the cured concrete.

After holding member 360, 660 is removed from its holding function by threaded rod 50, 650, bore portions 330, 630 are radially forced suddenly or biasingly toward central axis A-A. Sudden impact between bore portion 330, 360 and threaded rod 50, 650 during installation may release or generate enough sound energy or audible energy to enable an installer to detect (e.g., by hearing) the triggering of the bore portions against threaded rod 50, 650. Furthermore, while the installer is holding the threaded rod 50, 650 during installation, enough impact energy may be transferred through threaded rod 50, 650 for an installer to feel vibration energy transferred (from the potential energy in bias members 310, 610) through the threaded rod 50, 650 to notify the installer that bore portions 330, 630 have triggered.

Figure 3:
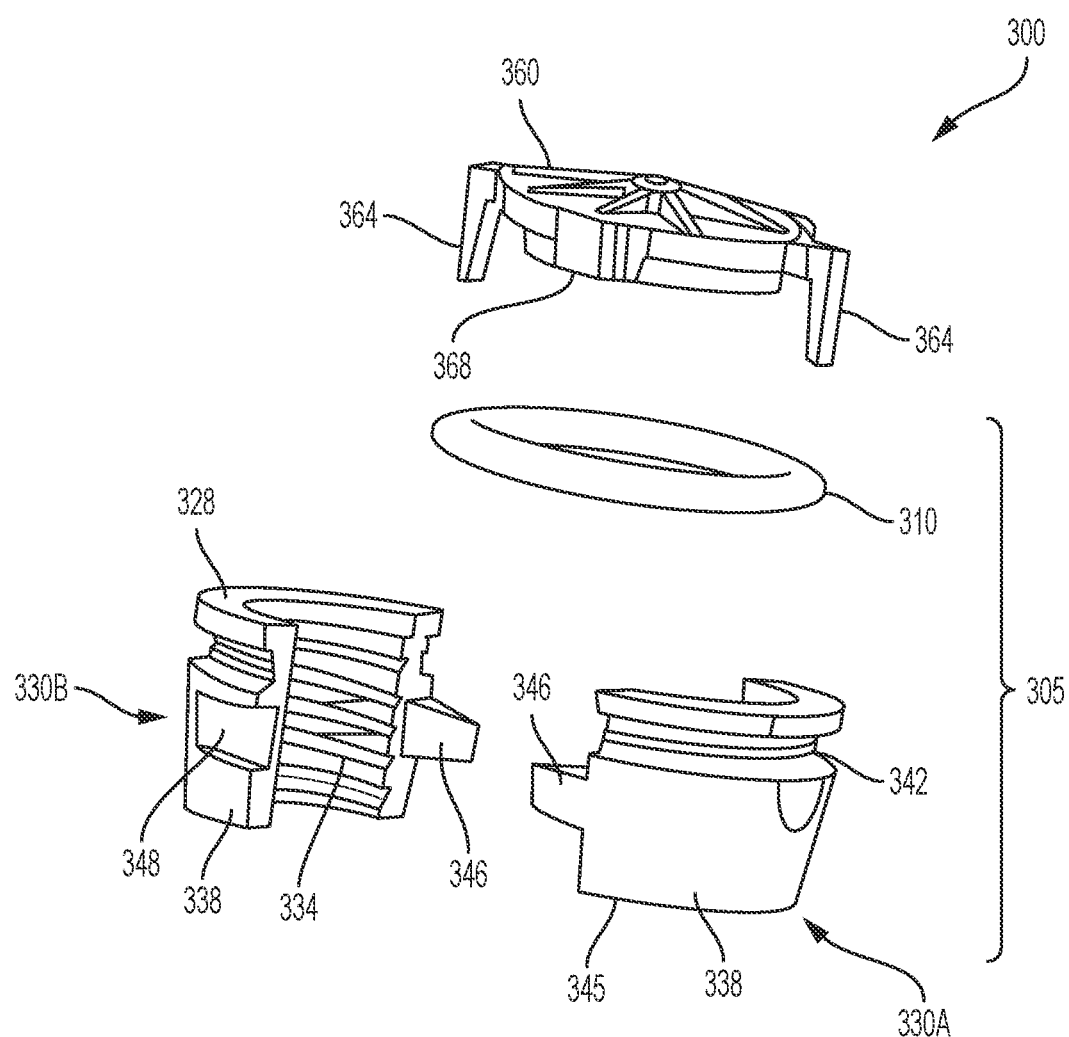
FIG. 3 is an exploded view of a locking assembly of the anchor assembly of FIGS. 1 and 2.

The snap-nut assembly described above may be utilized in any anchoring system in which it is desired to axially secure a shaft such as a threaded shaft to a support structure. Therefore, the snap-nut assemblies of FIGS. 4A and 6A may be integrated into various anchoring systems including metal deck anchoring systems such as described in U.S. Pat. No. 4,007,563 to Nakagawa. For example Nakagawa's FIG. 3 shows a cross section of the deck anchor installed on a deck plate. A male thread 1b extends downward and first end of a female threaded nut 6 is threaded onto male thread 1B. A second end of female thread 6 is exposed for receiving a threaded rod for anchoring the threaded rod to the decking 10.

Figure 10:
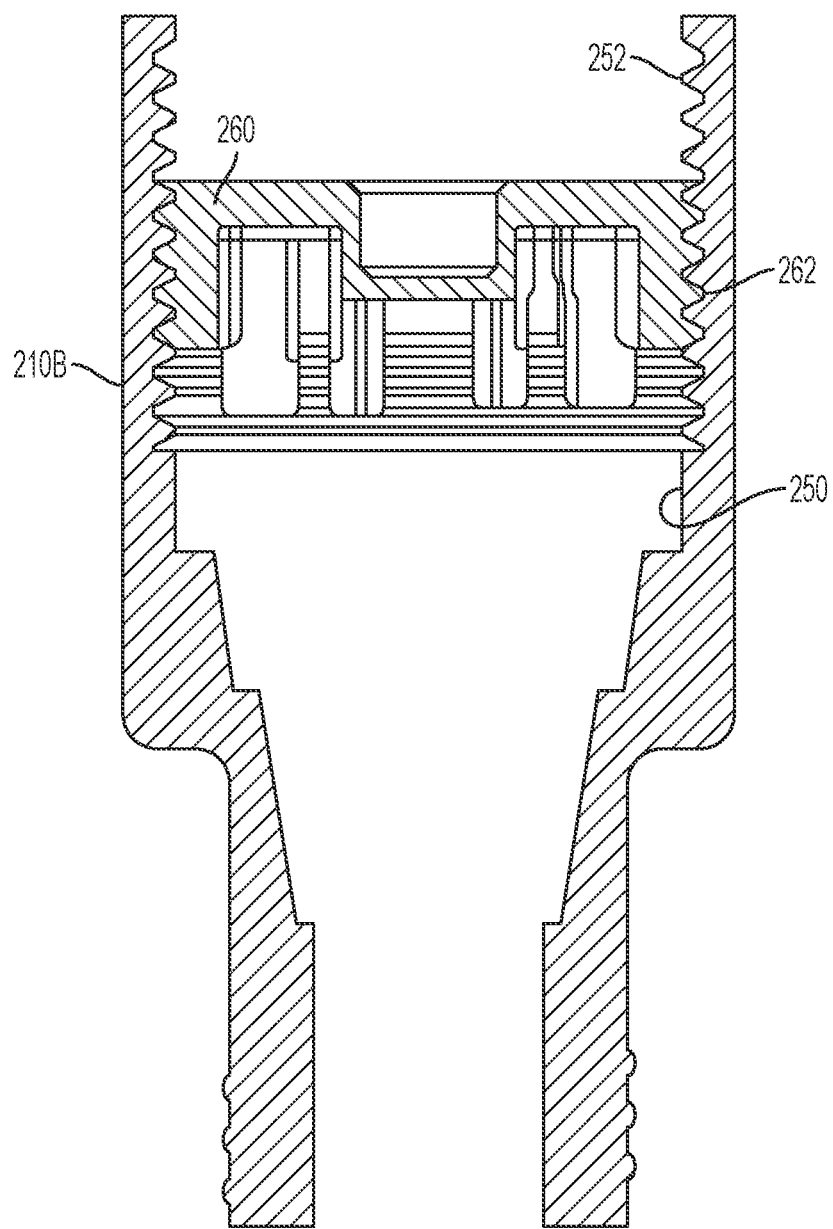
FIG. 10 is a cross-sectional view of an embodiment of an outer housing for use with the deck anchor of FIG. 9.

FIG. 10 shows a modified support portion 210B including extended walls of upper wall surface 250 including an extended locking surfaces 252. Locking mechanism 262 of plug 260 is installed in a lower portion with locking surface 252 so that an upper female threaded portion of locking surface 252 is exposed. In this form, support member 210B may be combined with Nakagawa's deck anchoring device to provide a deck anchor with the claimed snap-nut anchoring system. Specifically, the device of FIG. 10 may be substituted for Nakagawa's internally threaded nut 6 to combined Nakagawa's FIG. 3 with the claimed snap-nut locking anchor mechanism. Here, the exposed upper female locking portion 252 may be simply threaded onto male thread 1b. A threaded rod may then be locked in the snap-nut locking mechanism as described above.

The invention claimed is:

1. A support member of an anchor assembly, the support member for receiving and securing a threaded shaft thereto, the support member comprising:
   an outer housing, the outer housing being defined by a longitudinal axis (A-A), the outer housing including a wall, the outer housing also including a connector opening at a first end thereof for receiving the threaded shaft, the housing wall including an inner surface defining a bore space,
   a bore assembly disposed in the bore space, the bore assembly including at least two female threaded bore portions the threads of which selectively engage threads of the shaft, the bore assembly further including a flexible bias member for generating a biasing force to bias the at least one female thread bore portion toward the longitudinal axis (A-A),
   a first of the at least two female thread bores including a projection extending therefrom and toward a second of the at least two female thread bores, the second of the at least two female thread bores including a track, the projection slidingly engaging the track to promote alignment between the first and second of the at least two female thread bores as the first and second of the at least two female thread bores move toward and away from the longitudinal axis (A-A), wherein
   the projection is tapered away from the first of the at least two female threaded bores and the track of the second of the at least two female threaded bores is complementarily tapered to promote compliance between the projection and the track.

2. The support member of claim 1, wherein the first of the two female thread bores includes at least one first projection and at least one first track and the second of the at least two female thread bores includes at least one second projection and at least one second track.

3. The support member of claim 2, wherein the first projection is slidingly received in the second track and the second projection is received in the first track.

4. The support member of claim 1, wherein the at least two female threaded bores include an outer surface and the projection and track are within the outer surface.

5. The support member of claim 1, wherein the at least two female threaded bores include an outer surface and the projection and track are along the outer surface.

6. The support member of claim 1, wherein the projection includes an upper engagement surface and a lower engagement surface for slidingly engaging respectively with upper and lower engagement surfaces of the track.

7. The support member of claim 1, wherein biasing is toward the central axis A-A is due to a biasing against a tapered conical surface.

8. The support member of claim 1, wherein the projection includes a radially inner surface for slidingly engaging a radially outer surface of the track.

9. The support member of claim 1, wherein multiple projections project from the first of the two threaded female bores and multiple tracks of the second of the two threaded female bores receive the projections.

10. The support member of claim 1, wherein the at least two threaded female bores become more aligned as the tapered projection and the complementarily tapered track translate toward the central axis A-A.

11. The support member of claim 1, wherein the projection and the track slidingly engage toward central axis A-A to align the at least two threaded female bores with a threaded rod along central axis A-A.

12. The support member of claim 1, wherein the at least two threaded female bores include grooves for receiving the bias member.

13. The support member of claim 1, wherein at least one of the at least two female threaded bore portions is biased toward the central axis A-A due to a biasing of the threaded bore portion between the flexible bias member and a tapered conical surface.

14. The support member of claim 1, wherein the outer housing further includes an assembly opening at a second end opposite the first end thereof to facilitate assembly of the bore assembly into the bore space.

* * * * *